United States Patent
Lee et al.

(10) Patent No.: US 10,039,069 B2
(45) Date of Patent: Jul. 31, 2018

(54) COMMUNICATION SYSTEM, BASE STATION, USER EQUIPMENT AND TIMING SYNCHRONIZATION METHOD FOR BASE STATION THEREOF

(71) Applicant: Industrial Technology Research Institute, Hsinchu (TW)

(72) Inventors: Chung-Lai Lee, New Taipei (TW); Chia-Lung Liu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 237 days.

(21) Appl. No.: 14/963,261

(22) Filed: Dec. 9, 2015

(65) Prior Publication Data
US 2017/0118731 A1   Apr. 27, 2017

(30) Foreign Application Priority Data
Oct. 21, 2015 (TW) .............................. 104134512 A (51) Int. Cl.
*H04W 56/00* (2009.01)
*H04W 24/02* (2009.01)
(Continued)

(52) U.S. Cl.
CPC ....... *H04W 56/001* (2013.01); *H04L 43/0864* (2013.01); *H04W 24/02* (2013.01);
(Continued)

(58) Field of Classification Search
CPC combination set(s) only.
See application file for complete search history.

(56) References Cited

U.S. PATENT DOCUMENTS

| 7,840,228 B2 | 11/2010 | Suemitsu et al. |
| 8,984,654 B2 | 3/2015 | Zhang et al. |

(Continued)

FOREIGN PATENT DOCUMENTS

| CN | 102612134 | 7/2012 |
| CN | 103797868 | 5/2014 |

(Continued)

OTHER PUBLICATIONS

"Office Action of Europe Counterpart Application", dated Sep. 30, 2016, p. 1-p. 13.
(Continued)

*Primary Examiner* — Yee Lam
(74) *Attorney, Agent, or Firm* — JCIPRNET (57) ABSTRACT

A communication system, a base station, a user equipment (UE), and a timing synchronization method for the base station thereof are provided. The communication system includes a first base station, a second base station and the user equipment. The UE is located within coverage of the first base station and the second base station. The first base station and the second base station respectively measure signal stability of the user equipment so that the second base station selects the user equipment based on the measurements for the stability of the signals. The first base station computes a first timing error for transmitting or receiving message between the first base station and the user equipment then transmits the first timing error to the second base station. The second base station adjusts a timing difference between the first base station and the second base station through the first timing error.

33 Claims, 9 Drawing Sheets

(51) Int. Cl.
*H04W 24/10* (2009.01)
*H04W 72/04* (2009.01)
*H04W 88/02* (2009.01)
*H04W 88/08* (2009.01)
*H04L 12/26* (2006.01)

(52) U.S. Cl.
CPC ......... *H04W 24/10* (2013.01); *H04W 56/004* (2013.01); *H04W 72/0406* (2013.01); *H04W 88/02* (2013.01); *H04W 88/08* (2013.01)

(56) References Cited

U.S. PATENT DOCUMENTS

| | | | |
|---|---|---|---|
| 9,397,876 B2* | 7/2016 | Jalloul | H04L 27/2655 |
| 9,820,188 B2* | 11/2017 | Ekemark | H04W 28/08 |
| 2004/0121766 A1 | 6/2004 | Benson et al. | |
| 2008/0285539 A1 | 11/2008 | Tiedemann, Jr. et al. | |
| 2009/0093222 A1* | 4/2009 | Sarkar | H04B 7/0617 455/115.1 |
| 2010/0215032 A1 | 8/2010 | Jalloul et al. | |
| 2012/0082058 A1* | 4/2012 | Gerstenberger | H04W 36/0083 370/252 |
| 2013/0029586 A1 | 1/2013 | Wang | |
| 2013/0034035 A1* | 2/2013 | Kazmi | H04W 56/0085 370/311 |
| 2013/0272132 A1* | 10/2013 | Heo | H04W 28/02 370/236.2 |
| 2014/0274062 A1 | 9/2014 | Centonza et al. | |
| 2014/0349650 A1* | 11/2014 | Pekonen | H04W 36/22 455/436 |
| 2015/0055645 A1 | 2/2015 | Cui et al. | |
| 2015/0092738 A1 | 4/2015 | Chakraborty et al. | |
| 2015/0172975 A1* | 6/2015 | Hansson | H04W 36/0083 455/436 |
| 2016/0100393 A1* | 4/2016 | Takashima | H04W 72/048 370/329 |

FOREIGN PATENT DOCUMENTS

| | | |
|---|---|---|
| CN | 104349451 | 2/2015 |
| TW | 201018164 | 5/2010 |
| TW | 201112824 | 4/2011 |
| WO | 2007147788 | 12/2007 |
| WO | 2015000109 | 1/2015 |

OTHER PUBLICATIONS

"Office Action of Taiwan Counterpart Application", dated Nov. 25, 2016, p. 1-p. 8.

Amin et al., "Network listening based synchronization techniques for femtocell systems", 2011 IEEE 22nd International Symposium on Personal, indoor and Mobile Radio Communications ( PIMRC), Sep. 11-14, 2011, pp. 1-5.

Li et al., "A Novel Time and Frequency Synchronization Algorithm for LTE System", 2011 7th International Conference on Wireless Communications, Networking and Mobile Computing (WiCOM), Sep. 23-25, 2011, pp. 1-4.

Sungwon Lee, "An Enhanced IEEE 1588 Time Synchronization Algorithm for Asymmetric Communication Link using Block Burst Transmission", IEEE Communications Letters, Sep. 2008, pp. 687-689.

Peng et al., "MS-Assisted Receiver-Receiver Time Synchronization Strategy for Femtocells", Vehicular Technology Conference (VTC Spring), 2011 IEEE 73rd, May 15-18, 2011, pp. 1-5.

Alla et al., "Lightweight inter-cluster Synchronization Scheme for Femtocell Network", 2013 International Conference on Computing, Electrical and Electronics Engineering (ICCEEE), Aug. 26-28, 2013, pp. 229-231.

Wang et al., "Network Time-Synchronization in TDD Based LTE-Advanced System", Vehicular Technology Conference, 2009. VTC Spring 2009. IEEE 69th, Apr. 26-29, 2009, pp. 1-5.

Wei et al., "Time-domain-cascade-correlation Timing Advance estimation method in LTE-A super coverage", 2013 IEEE International Conference on Wireless Communications & Signal Processing (WCSP), Oct. 24-26, 2013, pp. 1-6.

\* cited by examiner

COMMUNICATION SYSTEM, BASE STATION, USER EQUIPMENT AND TIMING SYNCHRONIZATION METHOD FOR BASE STATION THEREOF

CROSS-REFERENCE TO RELATED APPLICATION

This application claims the priority benefit of Taiwan application serial no. 104134512, filed on Oct. 21, 2015. The entirety of the above-mentioned patent application is hereby incorporated by reference herein and made a part of specification.

TECHNICAL FIELD

The disclosure relates to a communication system, and relates to a communication system, a base station, and a user equipment (UE) for timing synchronization between base stations and a timing synchronization method thereof.

BACKGROUND

A wireless broadband network system, such as a long term evolution (LTE), an LTE-advanced (LTE-A), and so on, includes two system modes, i.e., a time division duplex (TDD) system mode and a frequency division duplex (FDD) system mode. Generally speaking, the TDD-LTE and the FDD-LTE can be used to district different system modes.

Either in the LTE system or in the LTE-A system, unsynchronization in timing would lead to bad influence. In a system employing the TDD mode, interference may occur due to different signal directions between base stations or user ends. In a system employing the FDD mode, an enhanced intercell interference coordination (eICIC/Further-eICIC) mechanism adopted for solving co-channel interference problem between a high-power and a low-power base stations in a heterogeneous network system may not be used due to the base stations being unsynchronized with each other. Therefore, timing synchronization is a major subject to the system no matter whether the TDD mode or the FDD mode is adopted.

In a 4G long term evolution (4G LTE) network architecture, telecommunication service providers can solve the problem with respect to the timing synchronization between the base stations by using a global positioning system (GPS) based on protocols, such as a precise time protocol (PTP) defined by the IEEE 1588 standard or a radio-interface based synchronization (RIBS) protocol.

Nevertheless, in a timing synchronization method using the GPS, each base station may meet an accurately timing requirement through satellites; however, the base stations located indoors would be blocked from receiving GPS signals, while the cost would be increased if additional outdoor antennas are installed, which becomes the major problem that indoor type base stations cannot achieve the timing synchronization by using the GPS. On the other hand, in a timing synchronization method employing the IEEE 1588 standard, not only a back-end network has to support the PTP protocol defined by the IEEE 1588 standard, but also a wired network has to be provided with a bidirectional symmetry capability, which causes limitations to its application.

Moreover, a wireless interface synchronization mechanism is proposed in Releases 12 and 13 of the 3rd generation partnership project (3GPP), which is an synchronization mechanism extending the network listening capability originally launched in Release 9. The base stations using the wireless interface synchronization mechanism can perform the timing synchronization between the base stations and coordination and exchange of stratum levels through a backhaul; however, a distance between the base stations using this mechanism cannot be over 500 meters or four stratum levels, which also causes difficulties to the application.

SUMMARY

Accordingly, the disclosure introduces a communication system, a base station, a UE and a timing synchronization method for base stations thereof capable of facilitating an unsynchronized base station to achieve timing synchronization between the base stations through assistance by a UE.

A communication system is introduced herein. The communication system includes a first base station, a second base station and a user equipment (UE). The UE is located in a communication coverage of the first base station and the second base station. The second base station transmits a time synchronization request message to the first base station. The first base station and the second base station respectively measure signal stability of the UE, the second base station selects the UE based on a measurement result of the signal stability. The first base station computes a first timing error of message transmitting and receiving between the first base station and the UE and transmits the first timing error to the second base station, the second base station adjusts a time difference with the first base station according to the first timing error.

A timing synchronization method for base stations is introduced herein. The method is adapted to a communication system comprising a first base station, a second base station and a UE, and the UE is located in a communication coverage of the first base station and the second base station. The method includes a plurality of steps. A time synchronization request message is transmitted to the first base station by the second base station. Signal stability of the UE is measured respectively by the first base station and the second base station, the UE is selected by the second base station based on a measurement result of the signal stability. Thereafter, the first base station computes a first timing error of message transmitting and receiving between the first base station and the UE and transmits the first timing error to the second base station. A time difference between the first base station and the second base station is adjusted according to the first timing error by the second base station.

A base station is introduced herein. The base station is adapted to exchange information with another base station through a backhaul, while a communication coverage of the base station and the another base station contains a UE. The base station includes a transceiver unit, a storage unit and a processing unit. The transceiver unit is configured for message transmitting and receiving with the another base station or the UE. The storage unit stores a plurality of program codes. The processing unit is coupled to the storage unit and the transceiver unit and accesses the program codes to perform a plurality of operations. A time synchronization request message is transmitted to the another base station through the transceiver unit, and a UE list containing the UE is received from the another base station, signal stability of the UE is measured according to the UE list. The UE is selected based on a measurement result of the signal stability, and the another base station is notified of the selected UE through the transceiver unit. A time difference with the another base station is adjusted according to a first timing error between the first base station and the UE received from the another base station through the transceiver unit.

A timing synchronization method for base stations is introduced herein. The method is adapted to a base station and another base station exchanging information through a backhaul, and a communication coverage of the base station and the another base station contains a UE. The method includes a plurality of steps. A time synchronization request message is transmitted to the another base station. A UE list containing the UE is received from the another base station. Signal stability of the UE is measured according to the UE list. The UE is selected based on a measurement result of the signal stability, and the another base station is notified of the selected UE. Thereafter, a first timing error between the another base station and the UE is received from the another base station, and a time difference with the another base station is adjusted according to the first timing error.

A UE is introduced herein. The UE is located in a communication coverage of a first base station and a second base station. The UE includes a transceiver unit and a processing unit. The transceiver unit i exchanges information with the first base station and the second base station. The processing unit is coupled to the transceiver unit. The processing unit exchanges information with the first base station through the transceiver unit, the transceiver unit receives a first instruction message from the first base station. The processing unit transmits a reference message to the second base station through the transceiver unit according to the first instruction message. The transceiver unit receives a synchronization message from the second base station and receives a second instruction message from the first base station. The processing unit records an RTT of transmitting and receiving the reference message and the synchronization message with the second base station according to the second instruction message and transmits the RTT to the first base station through the transceiver unit. The reference message and the synchronization signal are periodic signals.

A timing synchronization method for base stations is introduced herein. The method is adapted to a UE located in a communication coverage of a first base station and a second base station. The method includes a plurality of steps. Information is exchanged with the first base station. A first instruction message is received from the first base station, and a reference message is transmitted to the second base station according to the first instruction message, while the reference message is a periodic signal. A synchronization message is received from the second base station, while the synchronization signal is a periodic signal. A second instruction message is received from the first base station, and an RTT of transmitting and receiving the reference message and the synchronization message between the UE and the second base station is recorded according to the second instruction message. The RTT is transmitted to the first base station.

To sum up, according to the embodiments of the disclosure, an unsynchronized base station and a synchronized base station can not only exchange information through the backhaul, but also evaluate the signal stability of a plurality of UEs in the communication coverage thereof to determine a UE so as to achieve timing synchronization assisted by the UE. In other words, for the unsynchronized base station and the synchronized base station, the unsynchronized base station is assisted by the UE for the timing synchronization with the synchronized base station. Accordingly, the unsynchronized base station can not only be free from the issues of being incapable of receiving the GPS signal due to locating indoors or other locations as the back-end network does not have to support the PTP protocol defined by the IEEE 1588 standard, but also meet a requirement that the synchronization error should be less than 3 µs.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

In the disclosure, a user equipment (UE) located within common communication coverage of a synchronized base station and an unsynchronized base station serves to assist timing synchronization between the unsynchronized base station and the synchronized base station. Thereby, after obtaining a first timing error of message transmission between the UE and the synchronized base station and/or a second timing error of message transmission between the UE and the unsynchronized base station, the unsynchronized base station may adjust a time difference with the synchronized base station according to the first timing error and/or the second timing error, so as to achieve timing synchronization between the base stations.

Figure 1:
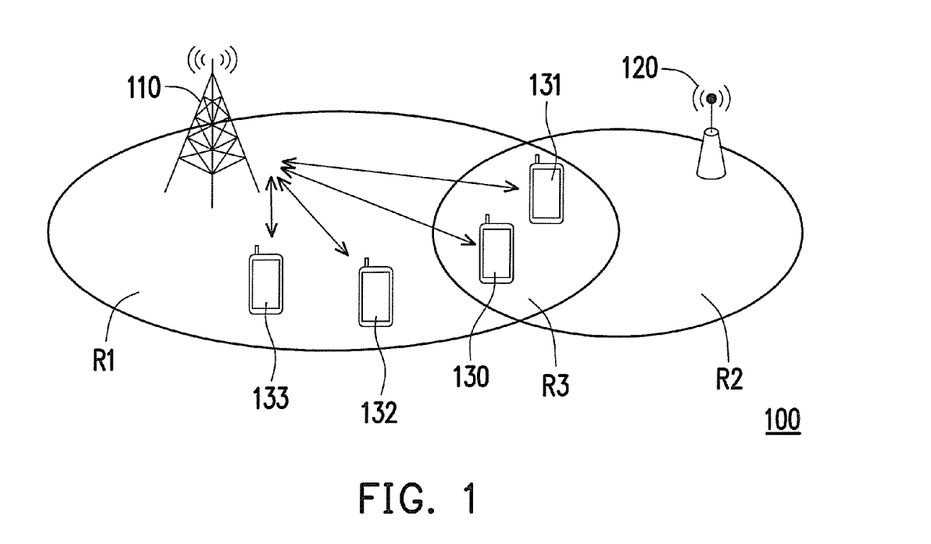
FIG. 1 is a schematic diagram illustrating a communication system according to an embodiment of the disclosure.

FIG. 1 is a schematic diagram illustrating a communication system according to an embodiment of the disclosure. Referring to FIG. 1, a communication system 100 of the present embodiment includes a first base station 110, a second base station 120 and a plurality of UEs 130, 131, 132 and 133. In the present embodiment, a first base station 110 is, for example, a macro base station (macro BS, and a second base station 120 is, for example, a sub base station be synchronized with the first base station 110, such as a pico BS, a femto BS, a home base station or other types of base station, which are not limited in the disclosure. In other words, the communication system 100 may be a heterogeneous network system, in which the first base station 110 is a macro BS, and the second base station 120 is a pico BS of the sub base station. However, the disclosure is not limited thereto, and various combinations thereof fall within the scope to be protect by the disclosure. For example, in another embodiment, both the first base station 110 and the second base station 120 are small cell stations.

Figure 2:
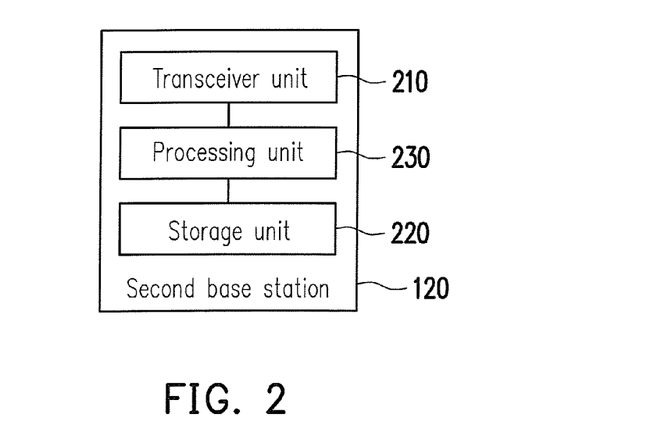
FIG. 2 is a function block diagram illustrating a base station according to an embodiment of the disclosure.

In the present embodiment, both the first base station 110 and the second base station 120 have the same implementation, and thus, the second base station 120 will be illustrated as an example for describing functions thereof. FIG. 2 is a function block diagram illustrating a base station according to an embodiment of the disclosure. The second base station 120 includes a transceiver unit 210, a storage unit 220 and a processing unit 230. The transceiver unit 210 functions as a general network interface card and is configured for message transmitting and receiving with another base station (i.e., the first base station 110) or the UEs 130, 131, 132 and 133. The storage unit 220 is, for example, a memory, a hard disk or other devices for storing data and is configured to store a plurality of program codes or modules. The processing unit 230 is coupled to the transceiver unit 210 and the storage unit 220. The processing unit 230 is configured to access the program codes stored in the storage unit 220.

Figure 3:
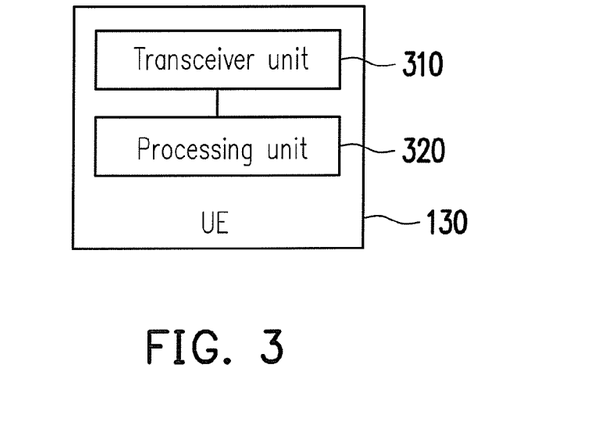
FIG. 3 is a function block diagram illustrating the user equipment (UE) according to an embodiment of the disclosure.

The UEs 130, 131, 132 and 133 are, for example, user terminals, such as mobile phones, tablet computers, notebook computers and so on, which are not limited in the disclosure. In the present embodiment, the UEs 130, 131, 132 and 133 have the similar implementation, and thus, the UE 130 is illustrated as an example foe describing functions thereof. FIG. 3 is a function block diagram illustrating the user equipment (UE) according to an embodiment of the disclosure. The UE 130 includes a transceiver unit 310 and a processing unit 320. The transceiver unit 310 also functions as a general network interface card and is configured to exchange information with the first base station 110 and/or the second base station 120 in FIG. 1. The processing unit 320 is coupled to the transceiver unit 310.

In the present embodiment, the processing unit 230 of the second base station 120 in FIG. 2 and the processing unit 320 of the UE 130 in FIG. 3 may be, for example, a general purpose processor, a special purpose processor, a conventional processor, a digital signal processor, a plurality of microprocessors, one or a plurality of microprocessors combined with a digital signal processor core, a controller, a micro controller, an application specific integrated circuit (ASIC), a field programmable gate array (FPGA), any other types of integrated circuit, state machine, advanced RISC machine (ARM)-based processor and similar devices, which construes no limitations to the disclosure.

In the embodiments of the disclosure, the first base station 110 and the second base station 120 may exchange information through a backhaul, but the disclosure is not limited thereto. It is to be mentioned that the timing synchronization between the first base station 110 and the second base station 120 is achieved by the assistance of the UEs 130, 131, 132 and 133. Thus, in a scenario that the first base station 110 or the second base station 120 is incapable of receiving a synchronization signal, the timing synchronization between the base stations may be achieved by the assistance of the UE (a timing synchronization method for base stations of the disclosure will be described in detail below with illustrations of embodiment).

Additionally, the precise time protocol (PTP) defined by the IEEE 1588 standard in the related art has limits, such as requiring support form a back-end network and bidirectional symmetry in a wired network. In the present embodiment, the backhaul may facilitate in achieving the timing synchronization between the base stations without the PTP defined by the IEEE 1588 standard, but the disclosure is not limited thereto. Meanwhile, the first base station 110 and the second base station 120 of the disclosure may be indoor base stations, and in order to prevent the first base station 110 and the second base station 120 from being incapable of receiving a global positioning system (GPS) signal due to the first base station 110 and the second base station 120 being blocked indoors, the first base station 110 or the second base station 120 may facilitate in achieving the timing synchronization between the base stations in case the GPS signal is incapable of being received, but the disclosure is not limited thereto.

On the other hand, referring to FIG. 1 again, part of a communication coverage R1 of the first base station 110 overlaps part of a communication coverage R2 of the second base station 120 in the present embodiment to form a communication coverage R3, where the part of communication coverage as mentioned herein may be the entire communication coverage or a portion of the communication coverage. The UEs 130 and 131 are located in the communication coverage R3 of the first base station 110 and the second base station 120, and the UEs 132 and 133 are located in the communication coverage R1 of the first base station 110. It should be noted that the present embodiment illustrates the UEs 130, 131, 132 and 133 for example, and other UEs may also be included in the communication coverages R1, R2 and R3 of the first base station 110 and the second base station 120, which are not limited in the disclosure.

Figure 4:
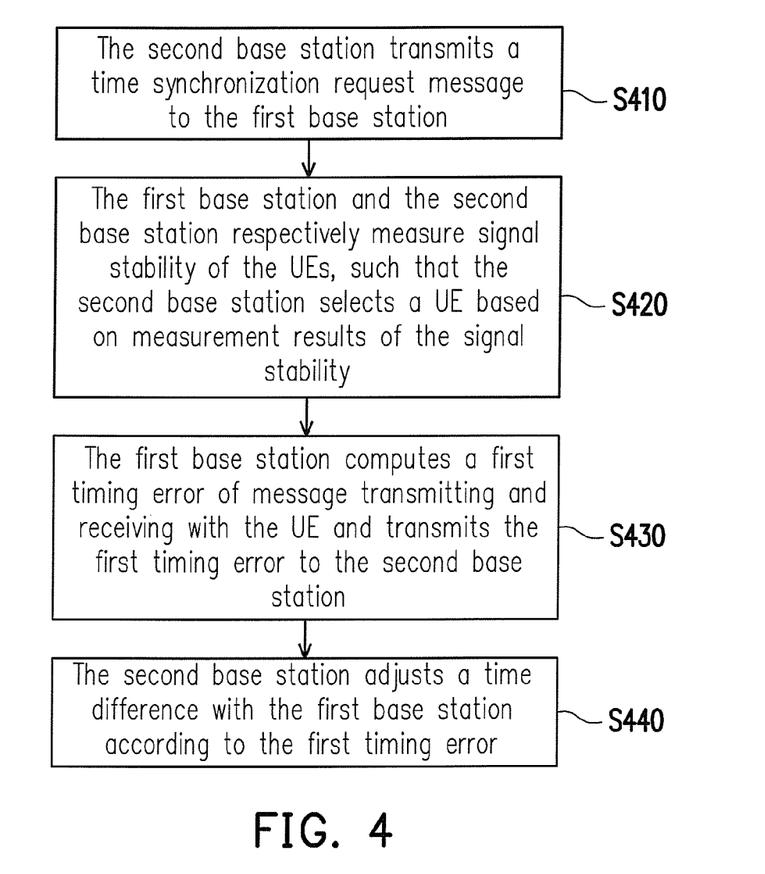
FIG. 4 is a flowchart illustrating a timing synchronization method for base stations according to an embodiment of the disclosure.

FIG. 4 is a flowchart illustrating a timing synchronization method for base stations according to an embodiment of the disclosure. Referring to both FIG. 1 and FIG. 4, the timing synchronization method for the base stations of the present embodiment is applied to the communication system 100 illustrated in FIG. 1, and each step of the timing synchronization method for the base stations of the disclosure will be described below with reference to each element of the communication system 100.

In step S410, the second base station 120 transmits a time synchronization request message to the first base station 110. In the present embodiment, as the second base station 120 is started up, the second base station 120 incapable of executing a random access procedure is incapable of transmitting or receiving data. The second base station 120 may obtain a list of nearby base stations through an Operations, Administration, and Maintenance (OAM) server and searches for a synchronized base station in the neighborhood by a mobility management entity (MME). When the second base station 120 selects the synchronized first base station 110 in a neighboring area as a target, such that the second base station 120 transmits the time synchronization request message to the first base station 110 when performing timing synchronization with the first base station 110.

In step S420, the first base station 110 and the second base station 120 respectively measure signal stability of the UEs 130, 131, 132 and 133, such that the second base station 120 selects the UE 130 based on measurement results of the signal stability. After receiving the time synchronization request message from the second base station 120, the first base station 110 initially measures the signal stability of the UEs 130, 131, 132 and 133 in the communication coverage R1 thereof, and notifies the second base station 120 of the measurement results, such that the second base station 120 further evaluates which UE may be used for the synchronization with the first base station 110 based on the measurement results. In this way, a UE adaptive for assisting the second base station 120 to synchronize with the first base station 110 may be selected through the communication and coordination between the second base station 120 and the first base station 110. For detailed description of step S420, step S420 is further divided into steps S510 to S530.

Figure 5:
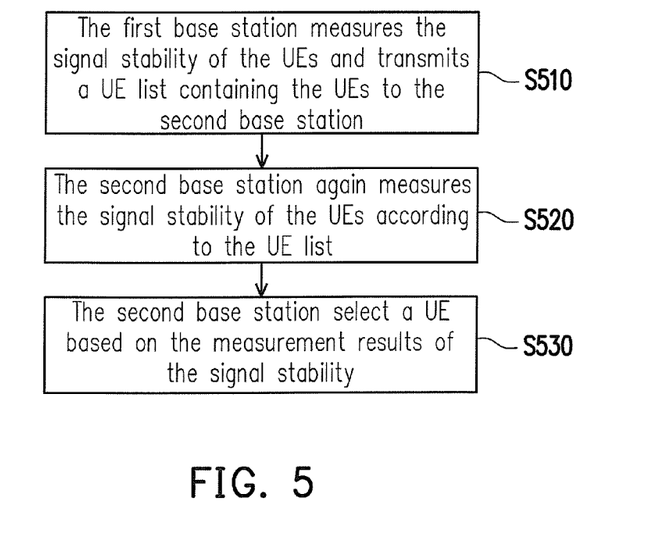
FIG. 5 is a flowchart illustrating a method selecting the assistant UE between base stations according to an embodiment of the disclosure.

Referring to FIG. 5, FIG. 5 is a flowchart illustrating a method selecting the assistant UE between base stations according to an embodiment of the disclosure. In step S510, the first base station 110 measures the signal stability of the UEs 130, 131, 132 and 133 and transmits a UE list containing the UEs 130, 131 and 132 to the second base station 120. In the present embodiment, after receiving the time synchronization request message from the second base station 120, the first base station 110 initially measures the signal stability of the UEs 130, 131, 132 and 133 in the communication coverage R1 thereof to search for an adaptive UE to assist the second base station 120 for the synchronization.

Figure 6:
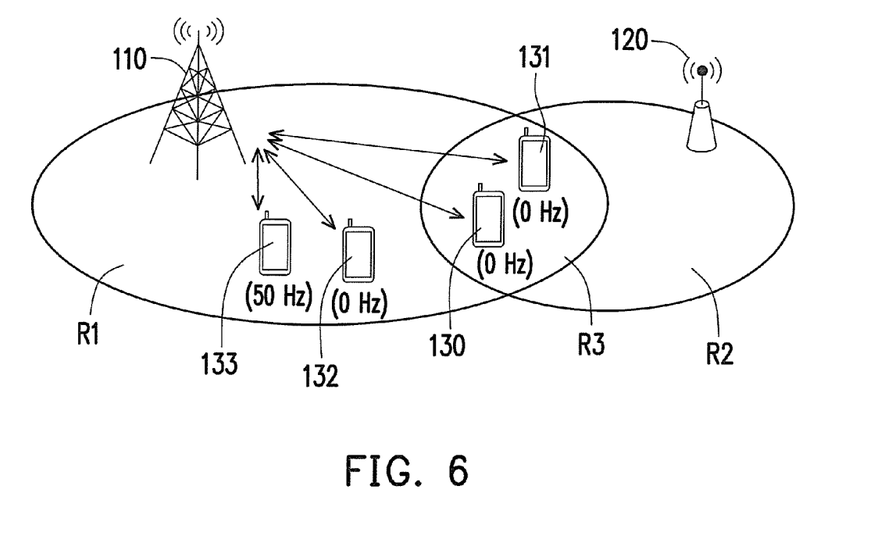
FIG. 6 is a schematic diagram illustrating a result of measuring the UE according to the Doppler shift according to an embodiment of the disclosure.

For instance, the first base station 110 may execute a random access procedure to measure a Doppler shift of each of the UEs 130, 131, 132 and 133, but the disclosure is not limited thereto. As a measurement result of a UE indicates an amount of the Doppler shift tends to 0 Hz, it indicates that the UE is in a stable state, and the signal stability thereof is high. FIG. 6 is a schematic diagram illustrating a result of measuring the UE according to the Doppler shift according to an embodiment of the disclosure. Referring to FIG. 6, the first base station 110 measures that the Doppler shifts of the UEs 130, 131, 132 and 133 are 0 Hz, 0 Hz, 0 Hz and 50 Hz, respectively. Thus, the measurement results of the Doppler shifts indicate that only the UEs 130, 131 and 132 are in the stable state, which indicates that the UEs 130, 131 and 132 have higher signal stability and are adaptive to assist the second base station 120 for the synchronization. The first base station 110 transmits the UE list containing the UEs 130, 131 and 132 to the second base station 120. Besides, the first base station 110 further instructs each of the UEs 130, 131 and 132 to periodically transmit an uplink reference signal to the second base station 120, such that the second base station 120 further evaluates the UE assisting for the synchronization. It should be mentioned that the uplink reference signal may be, for example, a sounding reference signal (SRS), which is not limited in the disclosure.

After receiving the UE list from the first base station 110, in step S520, the second base station 120 again measures the signal stability of each of the UEs 130, 131 and 132 according to the UE list. In the present embodiment, the second base station 120 may measure the Doppler shifts of the UEs 130, 131 and 132 and monitors cycles of the uplink reference signal to obtain the signal stability of each of the UEs 130, 131 and 132, which is not limited in the disclosure.

Since the first base station 110 further instructs each of the UEs 130, 131 and 132 to periodically transmit the uplink reference signal to the second base station 120 while transmitting the UE list containing the UEs 130, 131 and 132 to the second base station 120, the second base station 120 may monitor the cycle of the uplink reference signal of each of the UEs 130, 131 and 132 according to the received UE list and measure again the Doppler shift of each of the UEs 130, 131 and 132 according to the uplink reference signal. In this way, the second base station 120 may not only further evaluate and determine the signal stability of the UE to assist for the synchronization, but also serve to determine whether the UE available to assist the second base station 120 for the timing synchronization is still in the stable state.

Figure 7:
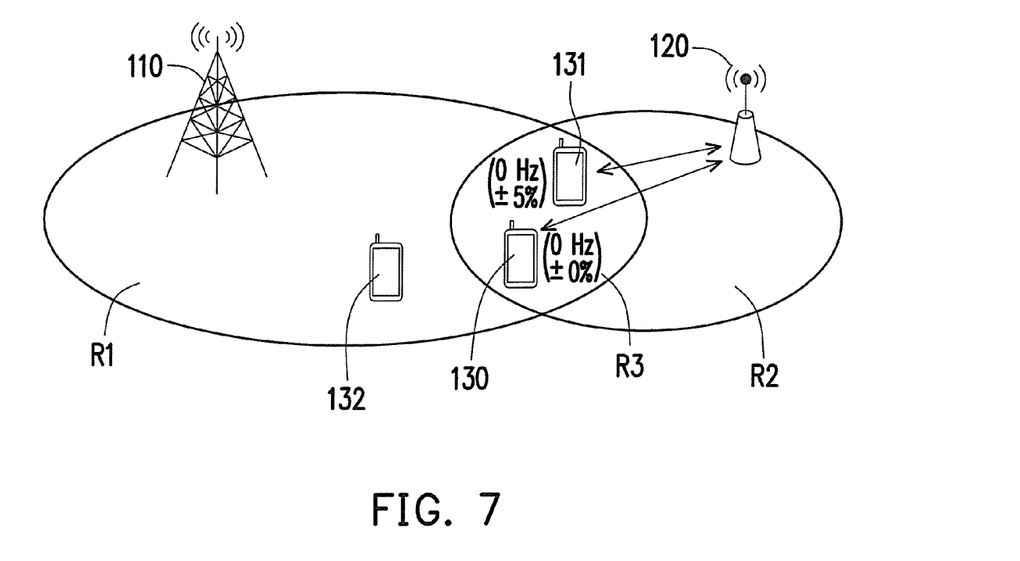
FIG. 7 is a schematic diagram of the second base station measuring the signal stability of each UE according to an embodiment of the disclosure.

For example, FIG. 7 is a schematic diagram of the second base station measuring the signal stability of each UE according to an embodiment of the disclosure. It should be noted that the UE 132 is not in the communication coverage R2 of the second base station 120, and thus, only the uplink reference signals of the UEs 130 and 131 may be monitored by the second base station 120. Therefore, the second base station 120 may only measure the signal stability of the UEs 130 and 131.

In the present embodiment, the second base station 120 detects the uplink reference signal transmitted by the UEs 130 and 131 to measure again the Doppler shifts of the UEs 130 and 131. Referring to FIG. 7, the measurement results indicate that the Doppler shifts of the UEs 130 and 131 are 0 Hz and 0 Hz, respectively, which indicate that the UEs 130 and 131 are still in the stable state. Additionally, the second base station 120 also measure cycles of the uplink reference signals of the UEs 130 and 131. It is assumed that the second base station 120 observes the UEs 130 and 131 for time period of five cycles and acquires that an average SRS cycle difference of the UE 130 ranges±0%, and an average SRS cycle difference of the UE 131 ranges±5% (as shown in FIG. 5). It should be mentioned that the disclosure is not intent to limit the times of the cycle of the uplink reference signal to be monitored, as long as the UE meeting the required condition and having the minimum cycle difference can be selected as the base for assisting the synchronization after N cycles are monitored.

In step S530, the second base station 120 selects the UE 130 based on the measurement results of the signal stability.

According to the results of the second base station 120 measuring the signal stability of the UEs 130 and 131, even though the measurement results indicate that both the UEs 130 and 131 are in the stable state, the signal stability of the UE 130 is higher than that of the UE 131 due to the UE 130 having a smaller average SRS cycle difference than the UE 131. Thus, the second base station 120 selects the UE 130 as the assistant UE to synchronize with the first base station 110. In the meantime, the second base station 120 notifies the first base station 110 of the selected UE 130 to perform subsequent step for the timing synchronization between the base stations.

Referring to FIG. 4 again, in step S430, the first base station 110 computes a first timing error T1 of message transmitting and receiving between the first base station 110 and the UE 130 and transmits the first timing error T1 to the second base station 120. In the embodiments of the disclosure, besides measuring the Doppler shift of each of the UEs 130, 131, 132 and 133 through performing the random access procedure, the first base station 110 also measures a first round trip time (RTT) RTT1 between the first base station 110 and each of the UEs 130, 131, 132 and 133, and computes a first timing error T1 of message transmitting and receiving between the first base station 110 and each of the UEs 130, 131, 132 and 133.

Figure 8:
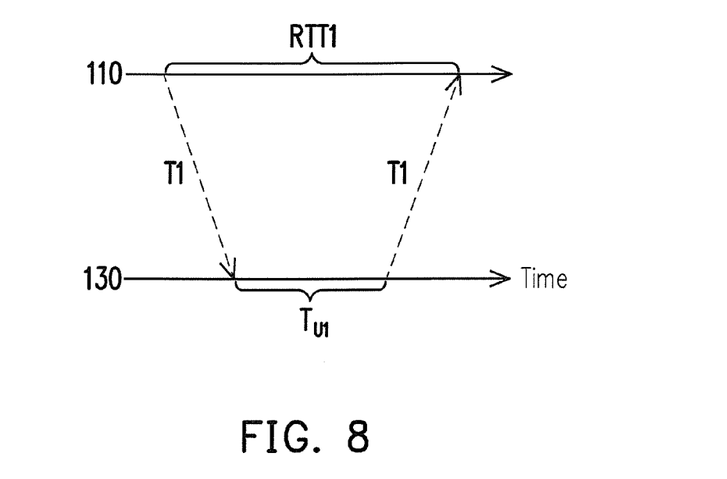
FIG. 8 is a schematic diagram of a round-trip time (RTT) between the first base station and a UE according to an embodiment of the disclosure.

For instance, FIG. 8 is a schematic diagram of a round-trip time (RTT) between the first base station and a UE according to an embodiment of the disclosure. Referring to FIG. 8, the first RTT RTT1 between the first base station 110 and the UE 130 includes a time required by the first base station 110 for transmitting a message to the UE 130, a time $T_{U1}$ required by the UE 130 for processing the message and a time required by the UE 130 for returning the message to the first base station 110. The first base station 110 deducts the time $T_{U1}$ required by the UE 130 for processing the message from the first RTT RTT1 to obtain the first timing error T1 for signal transmission between the first base station 110 and the UE 130 (i.e., including the time required by the first base station 110 for transmitting the message to the UE 130 and the time required by the UE 130 for returning the message to the first base station 110).

In the present embodiment, when the first base station 110 obtains that the second base station 120 selects the UE 130 as the synchronization-assisted UE, the first base station 110 performs the random access procedure on the UE 130 to measure the first RTT RTT1 between the first base station 110 and the UE 130 and computes the first timing error T1 for signal transmission between the first base station 110 and the UE 130 according to the first RTT RTT1 to provide the second base station 120 with information for synchronization (i.e., the first timing error T1).

In step S440, the second base station 120 adjusts a time difference with the first base station 110 according to the first timing error T1. In the present embodiment, after obtaining the first timing error T1 for single transmission between the UE 130 and the synchronized first base station 110, the second base station 120 adjusts its time by deducting the first timing error T1, so as to reduce a time difference with the first base station 110 for the timing synchronization with the first base station 110. In this way, the second base station 120 is synchronized with the synchronized first base station 110 according to the first timing error T1, as well as a synchronization error occurring when the second base station 120 is being synchronized with the synchronized first base station 110 may meet a timing synchronization requirement set up by the Small Cell Forum that synchronization error should be less than 3 µs.

Figure 9:
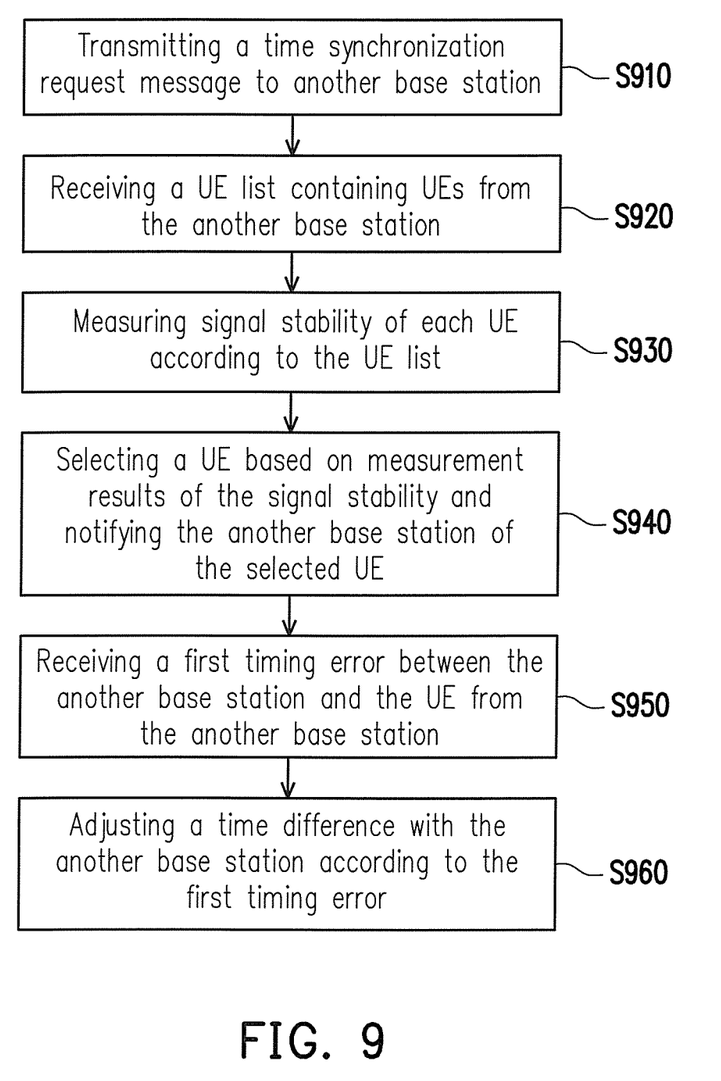
FIG. 9 is a flowchart illustrating the timing synchronization method for the base stations of the aforementioned embodiment of the disclosure in view of the unsynchronized base station.

FIG. 9 is a flowchart illustrating the timing synchronization method for the base stations of the aforementioned embodiment of the disclosure in view of the unsynchronized base station. Referring to both FIG. 2 and FIG. 9, an unsynchronized base station of the present embodiment is applied to the second base station 120 illustrated in FIG. 2. Each step of the timing synchronization method for the base stations of the disclosure will be described with reference to each element of the second base station 120.

In step S910, the second base station 120 transmits a time synchronization request message to another base station through the transceiver unit 210. In step S920, the second base station 120 receives a UE list containing UEs from the another base station through the transceiver unit 210. In step S930, the processing unit 230 measures signal stability of each UE according to the UE list. In step S940, the processing unit 230 selects a UE based on measurement results of the signal stability and notifies the another base station of the selected UE through the transceiver unit 210. In step S950, the second base station 120 receives a first timing error between the another base station and the UE from the another base station through the transceiver unit 210. In step S960, the processing unit 230 adjusts a time difference with the another base station according to the first timing error.

In brief, in the communication system and the timing synchronization method for the base stations of the present embodiment of the disclosure, the synchronized base station and the unsynchronized base station respectively measure the signal stability of a plurality of UEs in a common communication coverage thereof to coordinately select a UE adaptive to assist the unsynchronized base station for the timing synchronization. Afterwards, the synchronized base station computes the timing error of message transmitting and receiving between the synchronized base station and the UE, and transmits the timing error to the unsynchronized base station, such that the unsynchronized base station adjusts the time difference with the synchronized base station according to the timing error to achieve timing synchronization between the base stations. Accordingly, in the communication system of the disclosure, the unsynchronized base station performs the timing synchronization with the assistance by the UE, which not only solves issues encounter in other synchronization mechanisms, but also meet a timing synchronization requirement of the Small Cell Forum that synchronization error should be less than 3 µs.

On other hand, in other embodiments of the disclosure, the UE assisting the unsynchronized base station for synchronization may further support to record a time of transmitting or receiving a message in the signal transmission with the unsynchronized base station and report the time to the synchronized base station connected therewith. After the synchronized base station and the unsynchronized base station mutually exchange information, the unsynchronized base station may be synchronized with the synchronized base station accurately. Embodiments are provided below for detailed description.

Figure 10:
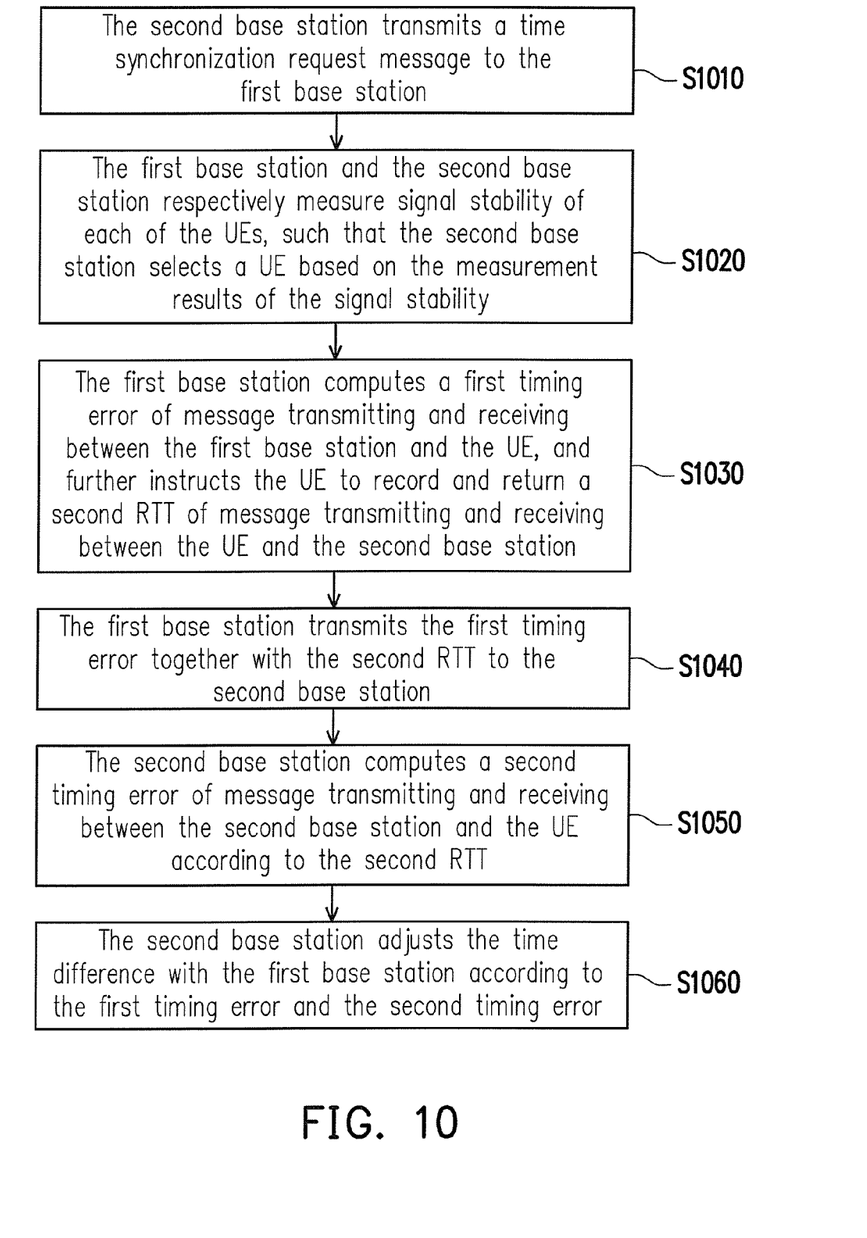
FIG. 10 is a flowchart illustrating a timing synchronization method for base stations according to another embodiment of the disclosure.

FIG. 10 is a flowchart illustrating a timing synchronization method for base stations according to another embodiment of the disclosure. Referring to both FIG. 1 and FIG. 10, the timing synchronization method for the base stations of the present embodiment is also applied to the communication system 100 illustrated in FIG. 1, and each step of the timing synchronization method for the base stations of the disclosure will be described below with reference to each element of the communication system 100.

In step S1010, the second base station 120 transmits a time synchronization request message to the first base station 110. In step S1020, the first base station 110 and the second base station 120 respectively measure signal stability of each of the UEs 130, 131, 132 and 133, such that the second base station 120 selects the UE 130 based on the measurement results of the signal stability. In step S1030, the first base station 110 computes a first timing error T1 of message transmitting and receiving between the first base station 110 and the UE 130, and further instructs the UE 130 to record and return a second RTT RTT2 of message transmitting and receiving between the UE 130 and the second base station 120. The implementation of steps S1010 to S1030 is the same as or similar to that in the embodiment above, which may be deduced with reference to the description related thereto and thus, will not be repeated.

Being different from the embodiment above, in the present embodiment, in step S1030, if the UE 130 supports to record the time of transmitting or receiving message in the signal transmission with the unsynchronized second base station 120, the first base station 110 further instructs the UE 130 to record and return the second RTT RTT2 of message transmitting and receiving in the signal transmission between the UE 130 and the second base station 120. The second base station 120 may return a synchronization signal periodically in response to the uplink reference signal while receiving the uplink reference signal, and thus, the first base station 110 may further instruct the UE 130 to record a time for the UE 130 transmitting the uplink reference signal to the second base station 120 and a time for the second base station 120 receiving the synchronization signal, and instructs the UE 130 to return them to the first base station 110. Thereby, the first base station 110 may obtain the second RTT RTT2 between the UE 130 and the second base station 120. It should be mentioned that the synchronization signal may be, for example, a primary synchronization signal (PSS) or a secondary synchronization signal (SSS), which is not limited in the disclosure.

Figure 11:
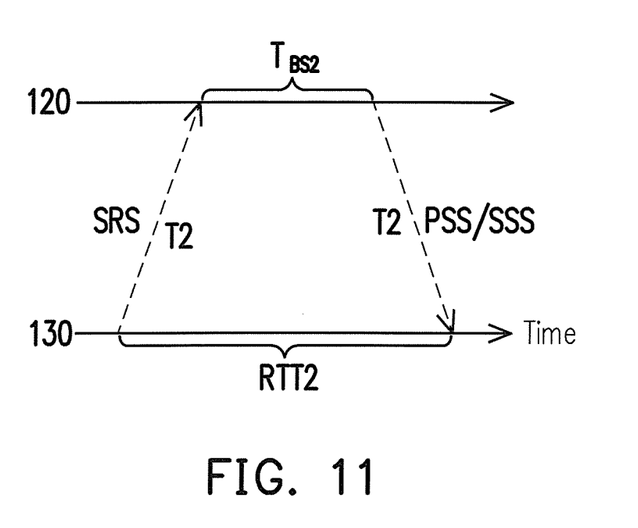
FIG. 11 is a schematic diagram of the RTT between the UE and the second base station according to an embodiment of the disclosure.

FIG. 11 is a schematic diagram of the RTT between the UE and the second base station according to an embodiment of the disclosure. Referring to FIG. 11, the second RTT RTT2 of message transmitting and receiving between the UE 130 and the second base station 120 includes a time required by the UE 130 for transmitting an uplink reference signal (SRS) to the second base station 120, a time $T_{BS2}$ required by the second base station 120 for processing the uplink reference signal and a time required by the second base station 120 for returning the synchronization signal (PSS/SSS) to the UE 130. In the present embodiment, the UE 130 may record the time of transmitting the uplink reference signal to the second base station 120 and the time of receiving the synchronization signal from the second base station 120 to obtain the second RTT RTT2. Thereafter, the UE 130 reply the second RTT RTT2 to the first base station 110.

In step S1040, the first base station 110 transmits the first timing error T1 together with the second RTT RTT2 to the second base station 120. In the present embodiment, the first base station 110 not only transmits the first timing error T1 of the signal transmission with the UE 130 to the second base station 120, but also replies the second RTT RTT2 of receiving and transmitting the message between the UE 130 and the second base station 120 to the second base station 120.

In step S1050, the second base station 120 computes a second timing error T2 of message transmitting and receiving between the second base station 120 and the UE 130 according to the second RTT RTT2. In the present embodiment, the second base station 120 deducts the time required for processing the uplink reference signal from the second RTT RTT2 to obtain the second timing error T2 for signal transmission between the UE 130 and the second base station 120 (i.e., including the time required by the UE 130 for transmitting the uplink reference signal to the second base station 120 and the time required by the second base station 120 for returning the synchronization signal to the UE 130).

In step S1060, the second base station 120 adjusts the time difference with the first base station 110 according to the first timing error T1 and the second timing error T2. After obtaining the first timing error T1 for signal transmission between the UE 130 and the synchronized first base station 110 and the second timing error T2 for single transmission between the UE 130 and the second base station 120, the second base station 120 adjusts its time by deducting a sum of the first timing error T1 and the second timing error T2, so as to reduce a time difference with the first base station 110 for the timing synchronization with the first base station 110. In this way, the second base station 120 may perform the timing synchronization with the synchronized first base station 110 accurately through the assistance of the UE 130 and further reduce the time difference of synchronization between the first base station 110 and the second base station 120 which is required to be less than 3 µs.

Figure 12:
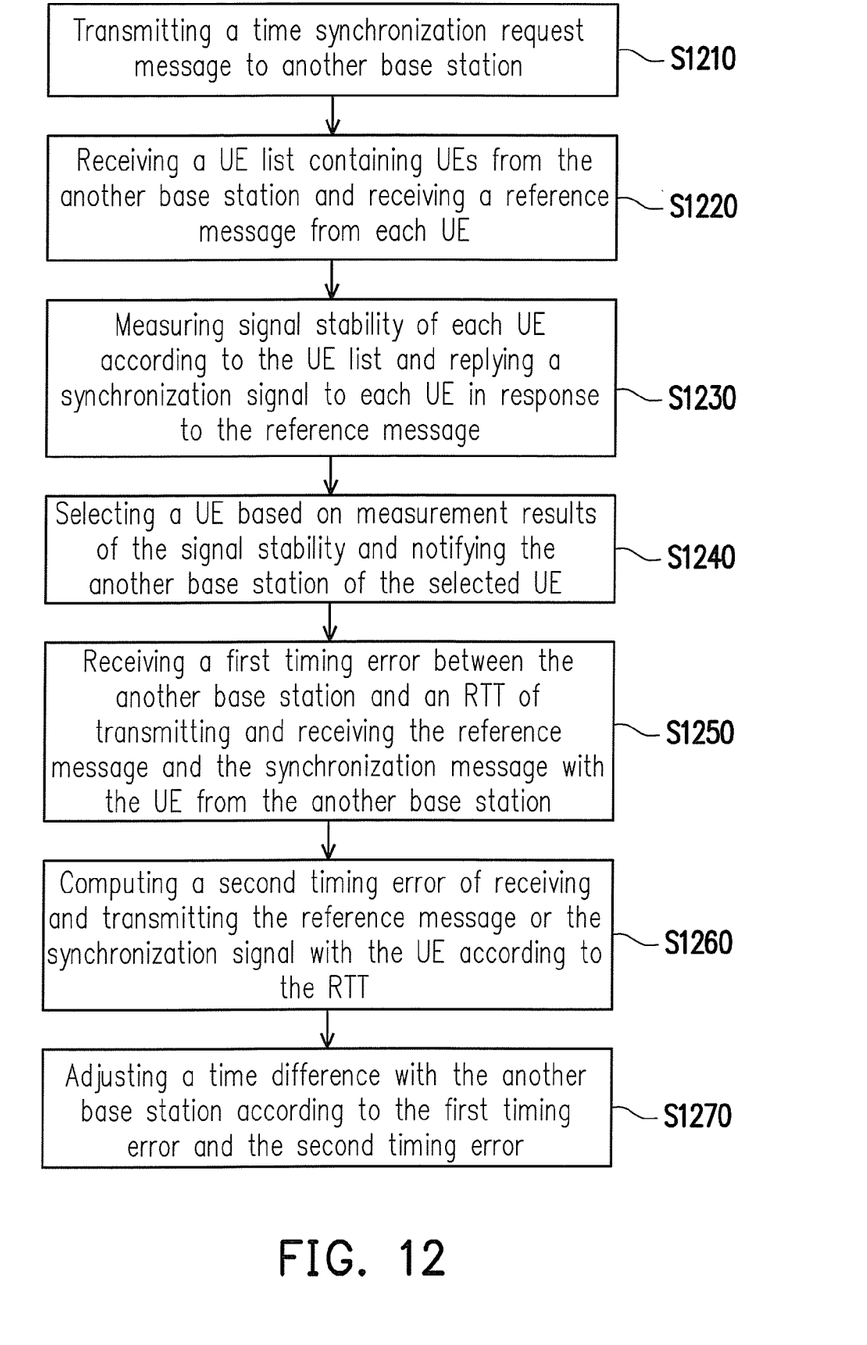
FIG. 12 is a flowchart illustrating the timing synchronization method for the base stations of the aforementioned embodiment of the disclosure in view of the unsynchronized base station.

FIG. 12 is a flowchart illustrating the timing synchronization method for the base stations of the aforementioned embodiment of the disclosure in view of the unsynchronized base station. In step S1210, a time synchronization request message is transmitted to another base station. In step S1220, a UE list containing UEs is received from the another base station, and a reference message is received from each UE, where the reference message is a periodic signal. In step S1230, signal stability of each UE is measured according to the UE list, and a synchronization message is replied to each UE in response to the reference message, where the synchronization message is a periodic signal. In step S1240, one of the UEs is selected according to measurement results of the signal stability, and the another base station is notified of the selected UE. In step S1250, a first timing error between the another base station and the selected UE from the another base station and an RTT of receiving and transmitting the reference message and the synchronization message between the another base station and the UE are received. In step S1260, a second timing error of receiving and transmitting the reference message or the synchronization signal with the UE and the unsynchronized base station is computed according to the RTT. In step S1270, a time difference with the another base station is adjusted according to the first timing error and the second timing error.

Figure 13:
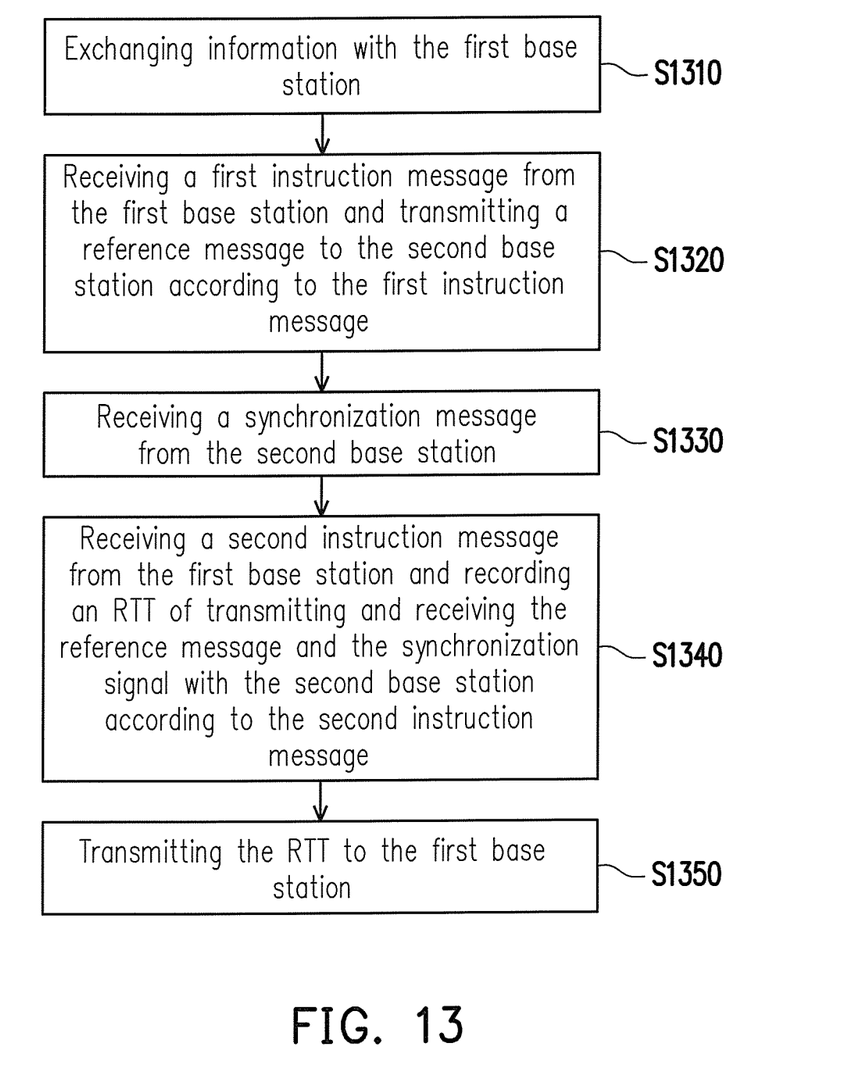
FIG. 13 is a flowchart illustrating the timing synchronization method for the base stations of the aforementioned embodiment of the disclosure in view of a UE.

FIG. 13 is a flowchart illustrating the timing synchronization method for the base stations of the aforementioned embodiment of the disclosure in view of a UE including a transceiver unit and a processing unit. Referring to both FIG. 3 and FIG. 13, the UE of the present embodiment is applied to the UE 130 illustrated in FIG. 3, and each step of the timing synchronization method for the base stations of the disclosure will be described below with reference to each element of the UE 130.

In step S1310, the UE 130 exchanges information with the first base station through the transceiver unit 310. In step S1320, the UE 130 receives a first instruction message from the first base station through the transceiver unit 310 and transmits a reference message to the second base station through the transceiver unit 310 according to the first instruction message, where the reference message is a periodic signal. In step S1330, the UE 130 receives a synchronization signal from the second base station through the transceiver unit 310, where the synchronization signal is a periodic signal. In step S1340, the UE 130 receives a second instruction message from the first base station through the transceiver unit 310, and the processing unit 320 records an RTT of transmitting the reference message to and receiving the synchronization signal with the second base station according to the second instruction message. In step S1350, the UE 130 transmits the RTT to the first base station through the transceiver unit 310. The steps S1310-S1350 may be implemented by the processing unit 320 of the UE 130.

In brief, in the communication system and the timing synchronization method for the base stations of the present embodiment of the disclosure, the UE supports is capable of recording the message receiving and transmitting time, such that the base station instructs the UE to record and return the message receiving and transmitting time in the signal transmission between the UE and the unsynchronized base station. Thereby, the unsynchronized base station may obtain not only the first timing error of the message transmitting and receiving time between the synchronized base station and the UE, but also the second timing error of message transmitting and receiving between the unsynchronized base station and the UE. Accordingly, the unsynchronized base station may adjust the time difference with the synchronized base station according to the first timing error and the second timing error accurately, so as to achieve the timing synchronization between the base stations.

In light of the foregoing, in the communication system, the base station, the UE and the timing synchronization method for the base stations according to the embodiments of the disclosure, the unsynchronized base station and the synchronized base station can not only mutually exchange information through the backhaul, but also respectively measure the signal stability of each UE in the communication coverage thereof to determine a UE with high stability for assistance, and accordingly, the unsynchronized base station can adjust the time difference with the synchronized base station according to the timing error in the signal transmission between the UE and the synchronized base station, so as to achieve the timing synchronization between the base stations. In this way, in the timing synchronization method for the base stations according to the embodiments of the disclosure, the unsynchronized base station can be synchronized with the synchronized base station through the assistance by the UE, and the unsynchronized base station can not only be free from the issues of being incapable of receiving the GPS signal due to locating indoors as the back-end network does not have to support the PTP protocol defined by the IEEE 1588 standard, but also meet the requirement that the synchronization error should be less than 3 µs. Moreover, since the UE can support the function of recording the message transmitting and receiving time, the unsynchronized base station can obtain not only the timing error of message transmitting and receiving between the synchronized base station and the UE, but also the timing error of message transmitting and receiving between the unsynchronized base station and the UE, so as to perform the timing synchronization with the synchronized base station accurately.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A communication system, comprising:
   a first base station;
   a second base station; and
   a user equipment (UE), located in a communication coverage of the first base station and the second base station,
   wherein the second base station transmits a time synchronization request message to the first base station, the first base station and the second base station respectively measure signal stability of the UE, the second base station selects the UE according to a measurement result of the signal stability, and the first base station computes a first timing error of message transmitting and receiving between the first base station and the UE and transmits the first timing error to the second base station, the second base station adjusts a time difference with the first base station according to the first timing error.

2. The communication system according to claim 1, wherein the first base station measures the signal stability of the UE and transmits a UE list containing the UE to the second base station, the second base station measures the signal stability of the UE again according to the UE list, and the second base station selects the UE based on the measurement result of the signal stability.

3. The communication system according to claim 1, wherein the first base station and the second base station measure the signal stability of the UE by measuring a Doppler shift of the UE and monitoring a cycle of an uplink reference signal of the UE.

4. The communication system according to claim 1, wherein the first base station further instructs the UE to record and return a round-trip time (RTT) of message transmitting and receiving between the UE and the second base station, the first base station transmits the first timing error together with the RTT to the second base station, such that the second base station computes a second timing error of message transmitting and receiving between the second base station and the UE according to the RTT, and the second base station adjusts the time difference with the first base station according to the first timing error and the second timing error.

5. The communication system according to claim 4, wherein the first base station and the second base station exchange information through a backhaul.

6. The communication system according to claim 5, wherein the backhaul does not support a precise time protocol (PTP) defined by the IEEE 1588 standard.

7. The communication system according to claim 5, wherein the first base station or the second base station is blocked from receiving a global positioning system (GPS) signal.

8. The communication system according to claim 1, wherein the first timing error comprises a time required by the first base station for transmitting a message to the UE and a time required by the UE for transmitting the message to the first base station.

9. The communication system according to claim 4, wherein the second timing error comprises a time required by the UE for transmitting a message to the second base station and a time required by the second base station for transmitting the message to the UE, and the RTT includes the time required by the UE for transmitting the message to the second base station, the time required by the second base station for transmitting the message to the UE and a time required by the second base station for processing the message.

10. A timing synchronization method for base stations, adapted to a communication system comprising a first base station, a second base station and a user equipment (UE), wherein the UE is located in a communication coverage of the first base station and the second base station, the method comprising:
    transmitting a time synchronization request message to the first base station by the second base station;
    measuring signal stability of the UE by the first base station and the second base station measure respectively, the UE is selected by the second base station based on a measurement result of the signal stability;
    computing a first timing error of message transmitting and receiving between the first base station and the UE and transmitting the first timing error to the second base station by the first base station; and
    adjusting a time difference between the first base station and the second base station according to the first timing error by the second base station.

11. The method according to claim 10, wherein the step of measuring the signal stability of the UE by the first base station and the second base station measure respectively, such that the second base station selects the UE based on the measurement result of the signal stability comprises:
    measuring the signal stability of the UE and transmitting a UE list containing the UE to the second base station by the first base station;
    measuring the signal stability of the UE again according to the UE list by the second base station; and
    selecting the UE based on the measurement result of the signal stability by the second base station.

12. The method according to claim 10, wherein the step of measuring the signal stability of the UE by the first base station and the second base station comprises:
    measuring a Doppler shift; and
    monitoring a cycle of an uplink reference signal.

13. The method according to claim 10, further comprising:
    instructing the UE to record and return a round-trip time (RTT) of message transmitting and receiving between the UE and the second base station by the first base station;
    transmitting the first timing error together with the RTT to the second base station by the first base station;
    computing a second timing error of message transmitting and receiving between the second base station and the UE according to the RTT by the second base station; and
    adjusting the time difference with the first base station according to the first timing error and the second timing error by the second base station.

14. The method according to claim 13, wherein the first base station and the second base station exchange information through a backhaul.

15. The method according to claim 14, wherein the backhaul does not support a precise time protocol (PTP) defined by the IEEE 1588 standard.

16. The method according to claim 14, wherein the first base station or the second base station is blocked from receiving a global positioning system (GPS) signal.

17. The method according to claim 13, wherein the second timing error comprises a time required by the UE for transmitting a message to the second base station and a time required by the second base station for transmitting the message to the UE, and the RTT includes the time required by the UE for transmitting the message to the second base station, the time required by the second base station for transmitting the message to the UE and a time required by the second base station for processing the message.

18. The method according to claim 10, wherein the first timing error comprises a time required by the first base station for transmitting a message to the UE and a time required by the UE for transmitting the message to the first base station.

19. A base station, adapted to exchange information with another base station through a backhaul, wherein a communication coverage of the base station and the another base station contains a UE, the base station comprising:
    a transceiver, configured for message transmitting and receiving with the another base station or the UE;
    a storage, storing a plurality of program codes; and
    a processor, coupled to the storage and the transceiver and accesses the program codes to perform operations of:
        transmitting a time synchronization request message to the another base station through the transceiver, and receiving a user equipment (UE) list containing the UE from the another base station, measuring signal stability of the UE according to the UE list;
        selecting the UE based on a measurement result of the signal stability and notifying the another base station of the selected UE through the transceiver; and
        adjusting a time difference with the another base station according to a first timing error between the base station and the UE received from the another base station through the transceiver.

20. The base station according to claim 19, wherein the operation of the processor measuring the signal stability of the UE comprises:
    measuring a Doppler shift; and
    monitoring a cycle of an uplink reference signal.

21. The base station according to claim 19, wherein the processor is configured to receive the first timing error and a round-trip time (RTT) of message transmitting and receiving with the UE from the another base station through the transceiver, so as to compute a second timing error of message transmitting and receiving with the UE according to the RTT.

22. The base station according to claim 21, wherein the processor is configured to adjust a time difference with the another base station according to the first timing error and the second timing error.

23. The base station according to claim 21, wherein the second timing error comprises a time required by the UE for transmitting a message to the base station and a time required by the base station for transmitting the message to the UE, and the RTT includes the time required by the UE for transmitting the message to the base station, the time required by the base station for transmitting the message to the UE and a time required by the base station for processing the message.

24. The base station according to claim 19, wherein the backhaul does not support a precise time protocol (PTP) defined by the IEEE 1588 standard.

25. The base station according to claim 19, wherein the first base station or the another base station is blocked from receiving a global positioning system (GPS) signal.

26. The base station according to claim 19, wherein the first timing error comprises a time required by the another base station for transmitting a message to the UE and a time required by the UE for transmitting the message to the another base station.

27. A timing synchronization method for base stations, adapted for a base station and another base station exchanging information through a backhaul, wherein a communication coverage of the base station and the another base station contains a user equipment (UE), the method comprising:
- transmitting a time synchronization request message to the another base station;
- receiving a UE list containing the UE from the another base station;
- measuring signal stability of the UE according to the UE list;
- selecting the UE based on a measurement result of the signal stability and notifying the another base station of the selected UE;
- receiving a first timing error between the another base station and the UE from the another base station; and
- adjusting a time difference with the another base station according to the first timing error.

28. The method according to claim 27, wherein the step of measuring the signal stability of the UE according to the UE list comprises:
- measuring a Doppler shift; and
- monitoring a cycle of an uplink reference signal.

29. The method according to claim 27, further comprising:
- receiving a reference message from the UE, wherein the reference message is a periodic signal;
- replying a synchronization message to the UE in response to the reference message, wherein the synchronization message is a periodic signal;
- receiving the first timing error and a round-trip time (RTT) of transmitting and receiving the reference message and the synchronization message from the another base station;
- computing a second timing error of transmitting and receiving the reference message and the synchronization message with the UE according to the RTT; and
- adjusting a time difference with the another base station according to the first timing error and the second timing error.

30. The method according to claim 29, wherein the second timing error comprises a time required by the UE for transmitting the reference message to the base station and a time required by the base station for transmitting the synchronization message to the UE, and the RTT includes the time required by the UE for transmitting the reference message to the second base station, the time required by the base station for transmitting the synchronization message to the UE and a time required by the base station for processing the reference message.

31. The method according to claim 27, wherein the backhaul does not support a precise time protocol (PTP) defined by the IEEE 1588 standard.

32. The method according to claim 27, wherein the base station or the another base station is blocked from receiving a global positioning system (GPS).

33. The method according to claim 27, wherein the first timing error comprises a time required by the another base station for transmitting the message to the UE and a time required by the UE for transmitting the message to the base station.

* * * * *